United States Patent
Gagne et al.

(10) Patent No.: US 9,731,836 B2
(45) Date of Patent: Aug. 15, 2017

(54) PROPULSION, ELECTRICAL, AND THERMAL MANAGEMENT DEVICE FOR A SMALL UNMANNED AERIAL VEHICLE

(71) Applicants: Rolls-Royce North American Technologies, Inc., Indianapolis, IN (US); Rolls-Royce Corporation, Indianapolis, IN (US)

(72) Inventors: Steven Gagne, Avon, IN (US); William L. Siegel, Mercersburg, PA (US); Jerry L. Wouters, Indianapolis, IN (US); Thomas Dannenhoffer, Clearwater Beach, FL (US)

(73) Assignees: Rolls-Royce North American Technologies, Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 132 days.

(21) Appl. No.: 14/133,155

(22) Filed: Dec. 18, 2013

(65) Prior Publication Data
US 2015/0001339 A1    Jan. 1, 2015

Related U.S. Application Data

(60) Provisional application No. 61/802,108, filed on Mar. 15, 2013.

(51) Int. Cl.
*B64D 41/00* (2006.01)
*B64D 35/00* (2006.01)
(Continued)

(52) U.S. Cl.
CPC ............ *B64D 41/00* (2013.01); *B64C 39/024* (2013.01); *B64D 13/06* (2013.01); *B64D 27/02* (2013.01); *B64D 27/10* (2013.01); *B64D 27/24* (2013.01); *B64D 35/00* (2013.01); *F02C 7/32* (2013.01); *F25B 27/00* (2013.01); *B64C 2201/042* (2013.01); *B64C 2201/048* (2013.01); *B64C 2201/165* (2013.01); *B64D 2013/0674* (2013.01); *B64D 2027/026* (2013.01); *F25B 2327/00* (2013.01); *Y02T 50/44* (2013.01); *Y02T 50/62* (2013.01)

(58) Field of Classification Search
CPC ........ B64D 41/00; B64D 35/00; B64D 35/02; B64D 35/04; B64D 13/021
USPC .............................................. 244/53, 58, 60
See application file for complete search history.

(56) References Cited

U.S. PATENT DOCUMENTS 2,700,311 A * 1/1955 Bade .............................. 475/330
3,121,546 A * 2/1964 Bruyere .......................... 244/55
(Continued)

FOREIGN PATENT DOCUMENTS

DE        102007033356 A1     1/2009

OTHER PUBLICATIONS

International Search Report PCT/US2013/075579 mailed on Oct. 14, 2014.

*Primary Examiner* — Michael Wang
(74) *Attorney, Agent, or Firm* — Fishman Stewart PLC

(57) ABSTRACT

An aircraft is provided with a gas turbine engine having a plurality of shafts. A first shaft provides power to an electrical generator and a propeller, while a second shaft provides power to a refrigeration system. The refrigeration system may be integrated to the propeller, like a ducted fan, or on the outer skin of the aircraft.

18 Claims, 3 Drawing Sheets

(51) Int. Cl.
  *B64C 39/02* (2006.01)
  *B64D 13/06* (2006.01)
  *B64D 27/02* (2006.01)
  *F02C 7/32* (2006.01)
  *B64D 27/10* (2006.01)
  *B64D 27/24* (2006.01)
  *F25B 27/00* (2006.01)

(56) References Cited

U.S. PATENT DOCUMENTS

| | | | |
|---|---|---|---|
| 4,399,665 A * | 8/1983 | Evans | B64D 13/08 |
| | | | 244/118.5 |
| 4,605,185 A * | 8/1986 | Reyes | 244/60 |
| 6,566,478 B1 | 5/2003 | Henning et al. | |
| 7,093,447 B2 * | 8/2006 | Thompson et al. | 60/784 |
| 7,285,871 B2 * | 10/2007 | Derouineau | 290/52 |
| 7,575,192 B1 | 8/2009 | Kish | |
| 7,758,302 B2 * | 7/2010 | Linet et al. | 415/68 |
| 7,882,691 B2 * | 2/2011 | Lemmers et al. | 60/39.163 |
| 8,162,611 B2 * | 4/2012 | Perkinson | B64C 11/06 |
| | | | 416/162 |
| 2006/0269414 A1 * | 11/2006 | Palcic et al. | 416/170 R |
| 2007/0022735 A1 | 2/2007 | Henry et al. | |
| 2008/0006739 A1 * | 1/2008 | Mochida et al. | 244/60 |
| 2010/0219779 A1 * | 9/2010 | Bradbrook | 318/153 |
| 2011/0154805 A1 * | 6/2011 | Heathco et al. | 60/226.1 |
| 2012/0216549 A1 * | 8/2012 | Burns | 60/786 |
| 2012/0247117 A1 * | 10/2012 | Gagne et al. | 60/772 |
| 2012/0248242 A1 * | 10/2012 | Gagne et al. | 244/58 |
| 2012/0266701 A1 * | 10/2012 | Yamada et al. | 74/15.82 |

\* cited by examiner

PROPULSION, ELECTRICAL, AND THERMAL MANAGEMENT DEVICE FOR A SMALL UNMANNED AERIAL VEHICLE

CROSS-REFERENCE TO RELATED APPLICATIONS

This application claims priority to U.S. Provisional Patent Application No. 61/802,108 filed Mar. 15, 2013, the contents of which are hereby incorporated in their entirety.

FIELD OF TECHNOLOGY

A system for providing propulsion, electrical generation and thermal management to an airframe, and more particularly, a system for providing propulsion, electrical generation and thermal management to an airframe from a single prime mover.

BACKGROUND

Aircraft have power requirements which exceed the requirements for propulsion alone. In addition to propulsion, aircraft require power for avionics and thermal management, namely cooling systems. Many times the avionics require incoming air temperature below ambient which requires thermal management for proper function. In addition to thermal management and electrical power is required to drive many of the systems aboard an aircraft, including the avionics. Typically, electrical generation and thermal management are discrete systems within an aircraft. For each additional system, a weight and efficiency burden is placed on the aircraft.

Another burden accompanying electrical generation and thermal management systems is drag on the aircraft. As additional systems are provided more drag is produced. Drag could be reduced however by a smaller total package. In addition the aircraft would benefit from reduced weight. Additionally if propulsion, thermal management and electrical power generation could be packaged together, the resulting system would be highly beneficial to the overall efficiency of the aircraft.

Engines in current unmanned aerial vehicles (UAVs) are typically piston engines which have limited performance and no margin for auxiliary power take off. A lower output shaft speed from the prime mover requires a larger electric generator, resulting in increased drag. Additionally there is the concern of providing too much power resulting in waste.

Current practice does not involve a system approach to integrating propulsion, electrical generation and thermal management to an airframe from a single prime mover. Although the approach is counterintuitive, by providing a more powerful prime mover, an improvement in overall performance could be achieved. The aforementioned problems would be eliminated if the output from a single prime mover can be integrated into a system providing propulsion, electrical power generation and thermal management. Thus, a system approach to this problem would be desirable.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1A:
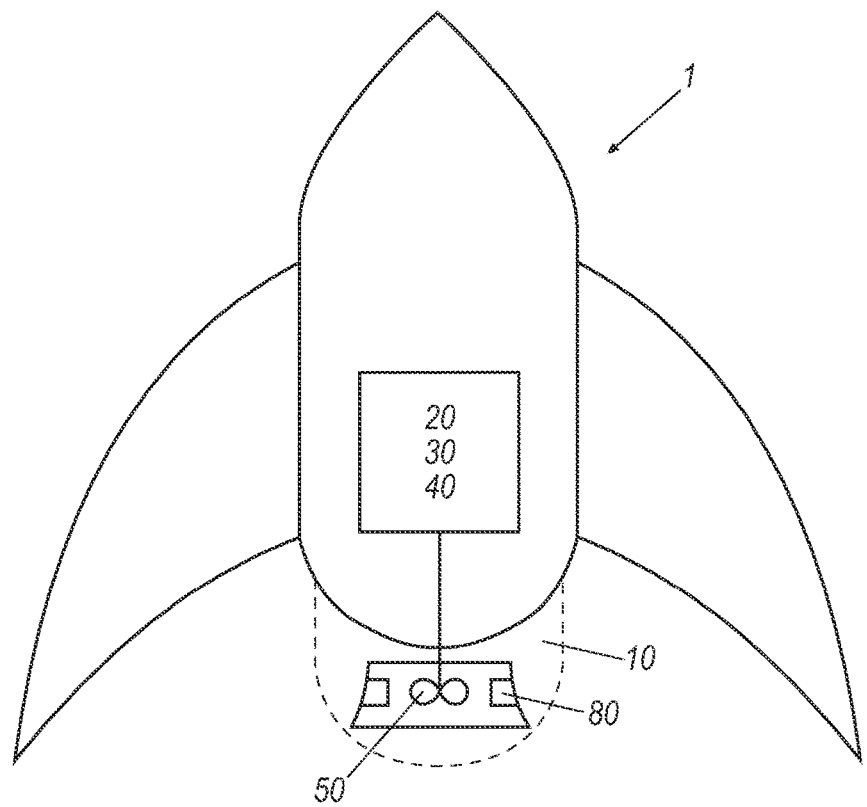
FIG. 1A is an environmental illustration revealing a plan view of an unmanned aerial vehicle incorporating one embodiment of a system for providing propulsion, electrical generation and thermal management.

Exemplary illustrations of a system for providing propulsion, electrical generation and thermal management to an airframe are described herein and are shown in the attached drawings. The system integrates the propulsion, electrical generation and thermal management into a single package sized for the system demand. The present disclosure is generally directed to aerial vehicles, and more specifically, but not exclusively, to unmanned aerial vehicles ("UAV"). One embodiment provides propulsion power, as well as electrical and cooling power. In one aspect an engine, such as a gas turbine engine, may be configured to provide mechanical power to a generator, a propeller, and a refrigeration system through a plurality of shafts.

For the purposes of promoting an understanding of the principles of the embodiments, reference will now be made to the embodiments illustrated in the drawings and specific language will be used to describe the same. It will nevertheless be understood that no limitation of the scope of the embodiments is thereby intended. Any alterations and further modifications in the described embodiments, and any further applications of the principles of the embodiments as described herein are contemplated as would normally occur to one skilled in the art to which the embodiment relates.

Figure 1B:
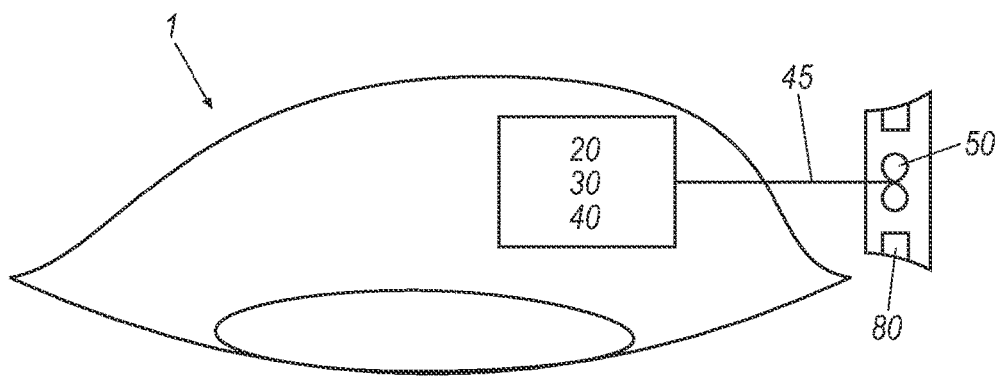
FIG. 1B is a side view of the environmental illustration of an unmanned aerial vehicle incorporating one embodiment of a system for providing propulsion, electrical generation and thermal management of FIG. 1A.

Referring now to FIG. 1A, an environmental illustration reveals a plan view of an unmanned aerial vehicle ("UAV") 1 incorporating one embodiment of a system 10 for providing propulsion, electrical generation and thermal management. The system 10 comprises a prime mover 20, such as a gas turbine engine, an example of which is the Rolls-Royce M250, a speed change transmission 30, such as a gearbox, and an electric machine 40, capable of generating electricity as well as converting electricity into torque, a propeller 50 and a vapor compression system 80. Referring now also to figure FIG. 1B, a shaft 45 is coupled to a propeller 50 to provide propulsion to the UAV 1.

Figure 2A:
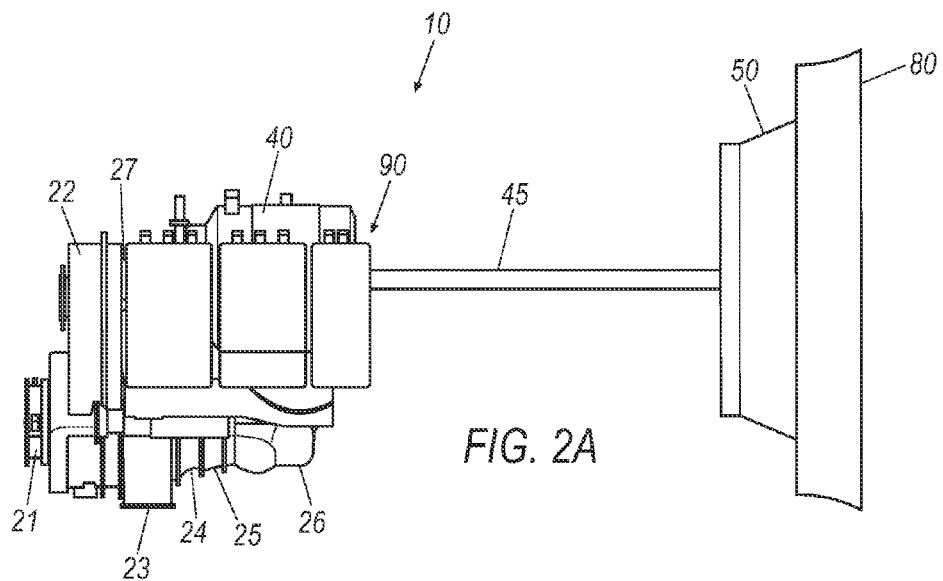
FIG. 2A is a plan view of one embodiment of a system for providing propulsion, electrical generation and thermal management to an airframe.

Referring now also to FIG. 2A, a plan view illustrates of one embodiment of a system 10 for providing propulsion, electrical generation and thermal management to an airframe. A prime mover 20, which in the present embodiment is a downward exhaust Rolls-Royce M250, with or without FADEC, provides power for propulsion, electrical generation and thermal management. The gas turbine engine 20 includes an inlet or compressor 21 which compresses incoming air which is then routed to the aft end of the engine 22 the combustor 26. Hot gas from the combustor 26 drives a gas generator 25 which powers the compressor 21. The hot gas then travels to a power turbine 24 which spins a power turbine 24 which provides power to a gearbox 22. The gearbox 22 transfers power to an output shaft 27. The Rolls-Royce M250 has an output shaft speed of about 6000 RPMs or 9000 RPMs.

Figure 2B:
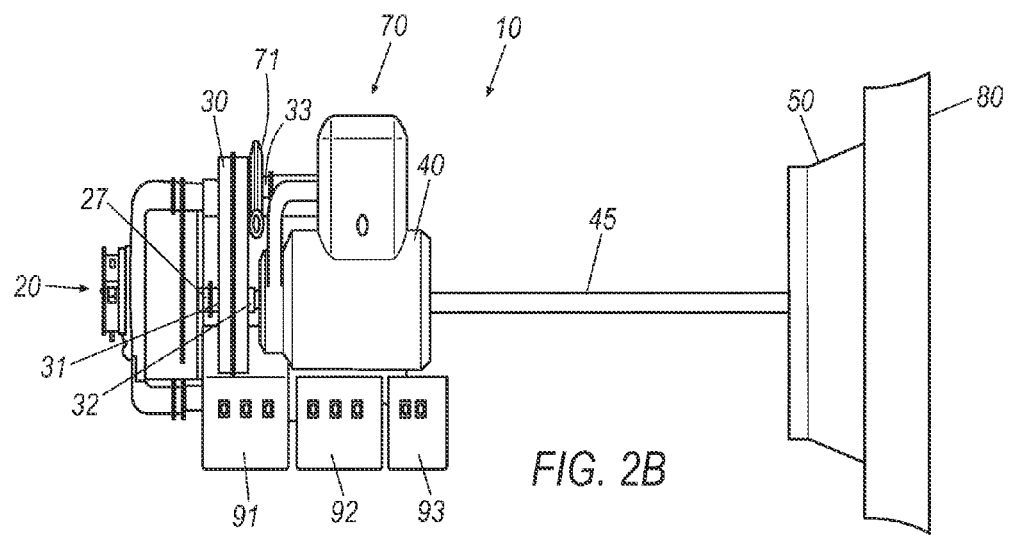
FIG. 2B is a side view of the embodiment of a system for providing propulsion, electrical generation and thermal management to an airframe.

Referring now also to FIG. 2B, a speed change transmission 30, an example of which is a gearbox, has an input shaft 31 and a plurality of output shafts 32, 33. The speed change transmission 30 enables the prime mover 20 to provide a suitable shaft speed for electrical power generation, refrigerant compression and propulsion. The speed change transmission 30 has a first output shaft 32 and a second output shaft 33. The transmission input shaft 31 is operatively connected to the prime mover output shaft 27 to distribute power from the prime mover 22 the first transmission output shaft 32 and the second transmission output shaft 33. The first transmission output shaft 32 is operatively coupled to an electric machine 40 and a propeller 50. The electric machine 40 and the propeller 50 are driven by shaft 45 and the electric machine 40 and the propeller 50 spin at the same speed. The electric machine 40 generates electrical power and provides shaft power to the propeller 50. The electric machine 40 may be coupled to the electrical storage system (not shown) to store excess power. The electrical machine 40 may be employed to power the propeller 50 during low fuel conditions by drawing power from the electrical storage system. A second transmission output shaft 33 is operatively coupled to a refrigerant compressor 71 of a vapor compression system 70 to provide thermal management. A refrigeration condenser 80 is shown integrated with the propeller 50, however the lines to and from the condenser 80 are not shown. A control and power electronics group 90 includes engine control 91, electrical control 92 and thermal control 93.

The speed change transmission 30 provides suitable speed to the propeller 50 and electric machine 40 through the first transmission output shaft 32 and suitable speed to the refrigerant compressor 71 through the second transmission output shaft 33. The speed change transmission 30 may step up the speed of one or more transmission output shafts 32, 33 to a suitable output shaft speed for electrical power generation, refrigerant compression and propulsion. The first transmission output shaft 32 may spin at a different speed then the second transmission output shaft 33. In addition a clutch (not shown) is provided to permit the electric machine 40 to drive the propeller 50 by disengaging the prime mover 20 from the electric machine 40 and powering the electric machine 40 from the electrical storage system. In one embodiment, a first shaft provides power to an electrical generator and a propeller, while a second shaft provides power to a refrigeration system.

Figure 3A:
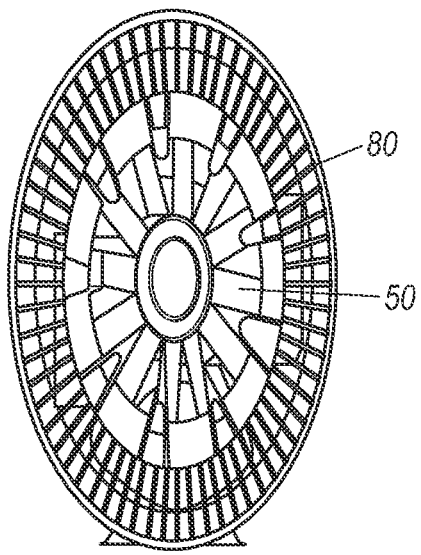
FIG. 3A is a rear view of a propeller incorporating a refrigeration condenser.
Figure 3B:
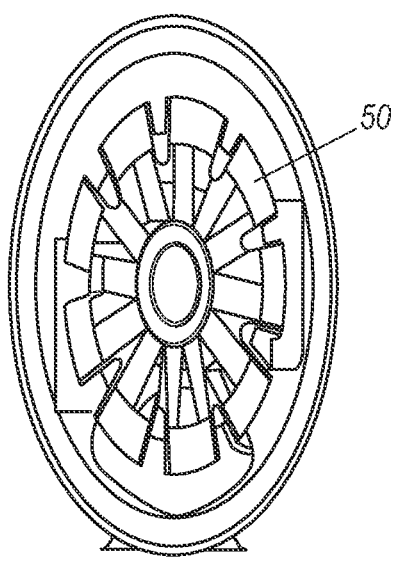
FIG. 3B is a rear view of a propeller without a refrigeration condenser.

Referring now also to FIG. 3A, a refrigeration condenser 80 is shown integrated with the propeller 50, like a ducted fan. Referring now also to FIG. 3B, a propeller 50 is shown without refrigeration condenser 80 integrated, where the refrigeration condenser 80 would otherwise be mounted on the outer skin of the aircraft 1.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

While s number of embodiments have been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system for providing propulsion, electrical generation and thermal management to an airframe from a single prime mover, comprising:
    an engine providing power to an engine output shaft;
    a speed change transmission, said transmission having an input shaft and at least two output shafts, said input shaft operatively connected to said engine output shaft to distribute power from said engine to a first transmission output shaft and a second transmission output shaft, said first transmission output shaft operatively coupled to an electric machine and to a propeller such that both said electric machine and said propeller are driven by said first transmission output shaft, and said second transmission output shaft operatively coupled to a refrigerant compressor of a refrigeration system, wherein said refrigerant compressor is coupled with said propeller via said first transmission output shaft and via said second transmission output shaft, and
    a condenser for said refrigeration system mounted on a structure that surrounds said propeller.

2. The system as set forth in claim 1, wherein said speed change transmission provides suitable speed to said propeller and said electric machine through said first transmission output shaft and to said refrigerant compressor through said second transmission output shaft.

3. The system as set forth in claim 1, further comprising an electrical storage system, said electrical storage system operatively coupled to said electric machine to receive electrical energy generated by said electric machine.

4. The system as set forth in claim 1, wherein said first transmission output shaft spins at a different speed than said engine output shaft.

5. The system as set forth in claim 1, wherein said engine is a gas turbine engine.

6. The system as set forth in claim 1, wherein said electric machine spins at the same speed as said propeller.

7. The system as set forth in claim 1, wherein said first transmission output shaft spins at a different speed than said second transmission output shaft.

8. The system as set forth in claim 1, wherein the first transmission output shaft and the second transmission output shaft are axially offset from one another.

9. A system for providing propulsion, electrical generation and thermal management to an airframe, comprising:
   a prime mover providing power to an output shaft;
   a speed change transmission having an input shaft and a plurality of output shafts, said input shaft operatively connected to said prime mover output shaft to distribute power from said prime mover to a first transmission output shaft at a suitable speed for electrical generation and propulsion and a second transmission output shaft at a suitable speed for refrigerant compression, said first transmission output shaft coupled directly to an electric machine and to a propeller to drive both said electric machine and said propeller, and said second transmission output shaft coupled to a refrigerant compressor of a refrigeration system, wherein said refrigerant compressor is coupled with said propeller, and wherein said input shaft drives said compressor via said second transmission output shaft, and said input shaft drives said propeller via said first transmission output shaft; and
   a condenser for said refrigeration system;
   wherein said condenser is mounted on a structure that surrounds said propeller.

10. The system as set forth in claim 9, further comprising an electrical storage system, said electrical storage system operatively coupled to said electric machine to receive electrical energy generated by said electric machine.

11. The system as set forth in claim 9, wherein said first transmission output shaft spins at a different speed than said prime mover output shaft.

12. The system as set forth in claim 9, wherein said prime mover is a gas turbine engine.

13. The system as set forth in claim 9, wherein said electric machine spins at the same speed as said propeller.

14. The system as set forth in claim 9, wherein said first transmission output shaft spins at a different speed than said second transmission output shaft.

15. A power management system for an unmanned aerial vehicle, comprising:
   a prime mover providing power to an output shaft;
   a gearbox having an having an input shaft and a plurality of output shafts, said input shaft operatively connected to said prime mover output shaft to distribute power from said prime mover to a first output shaft at a suitable speed for electrical generation and propulsion and a second output shaft at a suitable speed for refrigerant compression, said first output shaft coupled to both an electric machine and a propeller through said first output shaft such that both are driven by said first output shaft, and said second output shaft coupled to a refrigerant compressor of a refrigeration system, wherein said refrigerant compressor is coupled to said input shaft via at least said second output shaft, and said input shaft is coupled with said propeller via at least said first output shaft; and
   a condenser for said refrigeration system;
   wherein said refrigeration system is mounted on a structure that surrounds said propeller.

16. The power management system as set forth in claim 15, further comprising an electrical storage system, said electrical storage system operatively coupled to said electric machine to receive electrical energy generated by said electric machine.

17. The power management system as set forth in claim 15, wherein said electric machine spins at the same speed as said propeller.

18. The power management system as set forth in claim 15, wherein said first transmission output shaft spins at a different speed than said second transmission output shaft.

* * * * *